United States Patent
Peitz

[19]

[11] Patent Number: 5,942,170
[45] Date of Patent: Aug. 24, 1999

[54] PROCESS OF AND APPARATUS FOR PREPARING THERMOSETTING POLYMER PELLETS

[75] Inventor: Thomas A. Peitz, Saginaw, Mich.

[73] Assignee: B&P Process Equipment and Systems, L.L.C., Saginaw, Mich.

[21] Appl. No.: 08/928,827

[22] Filed: Sep. 12, 1997

Related U.S. Application Data

[60] Provisional application No. 60/026,122, Sep. 16, 1996.

[51] Int. Cl.[6] .............................. B02C 23/36; B29C 47/92
[52] U.S. Cl. ......................... 264/40.6; 210/376; 210/377; 210/781; 264/143; 264/237; 366/85; 366/291; 366/301; 425/67; 425/143; 425/204; 425/311; 425/377; 425/378.1; 425/382.2
[58] Field of Search ................................. 264/40.6, 142, 264/143, 237; 425/67, 143, 204, 311, 377, 378.1, 382.2; 210/376, 377, 781; 366/85, 291, 301

[56] References Cited

U.S. PATENT DOCUMENTS

| | | |
|---|---|---|
| 3,195,868 | 7/1965 | Loomans et al. . |
| 3,423,074 | 1/1969 | Loomans . |
| 3,463,316 | 8/1969 | Fierstine . |
| 3,564,650 | 2/1971 | Irving . |
| 3,642,406 | 2/1972 | Irving . |
| 5,391,617 | 2/1995 | Olivier et al. ............................ 525/72 |
| 5,679,380 | 10/1997 | Munz et al. . |

*Primary Examiner*—Leo B. Tentoni
*Attorney, Agent, or Firm*—Reising, Ethington, Barnes, Kisselle, Learman & McCulloch, P.C.

[57] ABSTRACT

A continuous method of and system for fabricating thermoset polymer pellets wherein thermosetting polymeric resin material flows axially in a temperature controlled, mixer-extruder barrel while maintaining the material between a melt temperature and a higher thermosetting reaction temperature, and extrudes from the barrel at an extrusion temperature between the melt and reaction temperatures. The extruded material is formed into generally spheroidal pellets which are cooled in a transporting coolant liquid stream and charged to the interior of an open ended, centrifuge basket having a porous circumferential wall and an interior annular pusher plate. The wall is rotated to demoisterize the pellets by centrifugally removing liquid coolant and while reciprocating the pusher plate and basket relatively to displace the pellets axially along and off the basket wall. Pellets are taken from the basket wall without substantially fracturing them and forming an undue percentage of fines.

20 Claims, 6 Drawing Sheets

FIG-1

PROCESS OF AND APPARATUS FOR PREPARING THERMOSETTING POLYMER PELLETS

The invention claims the priority of provisional application 60/026,122, filed Sep. 16, 1996.

This invention relates to a process for producing thermosetting feed stock particles for use in plastic powder coating and other applications, and more particularly to a process for controlling the shape and size distribution of such particles.

BACKGROUND OF THE INVENTION

Various plastic powder coating techniques are known for developing fusion-bonded plastic finishes. One common technique is electrostatic spraying in which plastic powder particles are electrostatically charged and sprayed toward a metal article that has been grounded, causing the particles to cling to the article until fused.

It is important that the size of the powder particles be carefully controlled since those that are too small (so-called "fines") tend not to cling to the article and constitute dust that must be dealt with. Typically, particles having a maximum dimension on the order of about 10 microns or less are considered fines, although the minimum size may depend to some degree on the particular compound involved, as those skilled in the plastic coating field will appreciate. Knowing this, manufacturers of plastic powder coating materials strive to select and control their manufacturing techniques in such way as to minimize the generation of fines and thus maximize their yield of usable product.

Traditional approaches to producing powder coating materials have depended to a large degree on whether the material being processed is a thermoplastic compound or a thermosetting compound, but involve generally the formation of melt-blended particles in either pellet or flake form that are fed to a grinder and pulverized to powder. The pellet form of feed material for the grinder is well recognized as being preferred over the flake form for a number of reasons. First, pellets are fairly free flowing in bulk and thus feed well into the grinder without binding. Flakes are far less flowable in bulk and tend to bridge in the feed system and, in extreme cases, jam the throat of the feed system requiring costly and labor intensive dismantling of the feed system to clear the jammed material.

Another recognized advantage pellets offer is that they can be made to have a generally uniform size and as a result are ground uniformly by the grinder with minimal fines generated. Flakes, on the other hand, are generally non uniform in size and much larger than pellets. The non-uniformity requires that the larger flakes be recirculated through the grinding chamber more often than the smaller flakes. The more often a flake is recirculated through the grinder, the more likely fines are to be generated. Consequently, the flake form tends to generate a higher percentage of fines when ground then does the pelletized material.

For reasons to be explained below, the processing technology available prior to this invention, insofar as applicant knows, has permitted only thermoplastic compounds to be produced in the desirable pelletized form and has required that thermosetting materials produced at a mass production rate be in the less desirable flake form.

One of the key characteristic differences between thermoplastic and thermosetting compounds that has contributed to the disparity between the processing technology available for these materials is that thermosetting compounds inherently take on a permanent set when heated above their cure temperatures and as a result must be carefully managed when processed in the molten state. Once cured, the material cannot be remelted and, if the material sets within processing equipment, can cause major problems which are expensive to overcome. Thermoplastics, on the other hand, can be reheated and reformed a number of times without significant change and, if hardened in a processing machine, can simply be reheated to overcome the problem.

Another major characteristic difference between thermoplastic and thermosetting compounds is that the latter tend to be considerably more brittle and prone to fracture during processing, which can lead to a higher production of undesirable fines in the processing operation.

The traditional approach to manufacturing pelletized thermoplastic powder coating compounds involves first pre-mixing the individual dry ingredients in a mixer, such as a typical high intensity mixer having either a fixed or removable bowl, to homogenize the ingredients. The dry mixture is then fed to a compounding extruder which melts the material, thoroughly blends it, and discharges it in molten form. Since thermoplastic compounds do not take on a permanent set when heated to high temperatures, it is common to process the material through the extruder at temperatures well above the melting temperature of the compound (e.g., typically 350 to 450° F. for some common thermoplastics), but below the charring temperature, in order to take advantage of a corresponding increase in the flowability of the material at the higher temperature. U.S. Pat. Nos. 3,195,868; 3,423,074; 3,564,650; and 3,642,406 disclose various compounding extruders of the general type that may be used to process thermoplastic compounds. The above patents and their disclosures are incorporated herein by reference.

The molten thermoplastic in the extruder is typically forced through a die to form strands of extrudate which are then pelletized in one of several ways including strand, hot face, and underwater pelletizing, a brief description of each being given below.

Strand pelletizing involves drawing the soft strands through a water quenching bath and then severing them into pellets as they exit the bath. The water is blown off the strands at the cutter. This process requires that the hot strands exhibit a certain amount of melt strength that allows them to be pulled through the water bath. Thermoplastic compounds typically possess the requisite melt strength, whereas thermosetting compounds, to my knowledge, do not. Consequently, I do not consider this pelletizing process to be available for thermosetting polymers and compounds.

The hot face pelletizing process utilizes a die having radially extending extrusion ports through which the material is extruded in strand form. A cutter rides against the radial face of the die and severs the hot extrudate strands into pellets. As the pellets are cut, they are thrown into an adjacent chamber where they are cooled and transported away by either water or air. A typical hot face pelletizing process is disclosed in the aforementioned U.S. Pat. No. 3,642,406. This process requires that the material exhibit a certain amount of shear strength in the extruded state which enables the strands to be severed cleanly by the cutter. Thermoplastic compounds possess this property, whereas thermosetting compounds do not. Thermosetting compounds typically have a characteristically low viscosity in the molten state which causes the material to smear across the die face when contacted by the cutter, rather than being cleanly severed like the thermoplastic material.

Underwater pelletizing is similar to hot face pelletizing except that the die and cutter are immersed in a water bath. As the strands exit the die, they are quenched and cut almost simultaneously into pellets, and as they exit and are cooled by the water they develop a generally spherical shape. It is to be noted that the generally spherical shape of the pellets is considered the most desirable of the pellet forms, since the additional roundness of the particles increases their bulk flowability. The pellets are carried away by the water to a pellet separator and then dried in a conventional centrifugal dryer. A typical design of dryer for thermoplastic polymers incorporates a vertically disposed high speed rotary blade mounted within a housing and an air stream passing upwardly through the housing. The pellets and any cooling water clinging to them are fed into the housing adjacent to its lower end and are hurled by the high speed blade against the wall of the housing and from there fall to the bottom of the dryer where they are collected. The water entrains in and is drawn upwardly with the air stream through a top discharge.

Although the described thermoplastic polymer pelletizing process works well for processing thermoplastic compounds, it is not used, to my knowledge, for processing thermosetting compounds. The inherent brittleness of thermosetting compounds causes them to fracture and be generally pulverized to fines upon impact with the rotary blade and housing of such a centrifugal dryer, making the material unsuitable as feed stock for the grinder.

Because of the above limitations in current processing technology, the traditional approach for processing thermosetting compounds has been in flake form and involves pre-mixing the individual ingredients and feeding them to an open-ended compounding extruder where the material is melted, thoroughly blended, and discharged in somewhat molten form to either a chill roll or cooling belt device which cools and flakes the material. The chill roll device employs two counter-rotating chill rolls between which the extrudate issues to squeeze and cool the material into a thin sheet form. Once cooled, the sheet is fed past a roller outfitted with pins which fracture the sheet into flakes or chips. The cooling belt apparatus similarly has two chill rolls which squeezes and cools the extrudate into a thin sheet form. The sheet exiting the chill rolls is deposited onto a cooling conveyor belt which is of considerable length and, when the strip is sufficiently cooled, it is broken into flakes in similar fashion.

SUMMARY OF THE INVENTION

It is an object of the present invention to provide a method for processing thermosetting powder coating compounds in pelletized form, rather than the flake form, as feedstock for a grinder, and to do so in a way that makes the pelletized form commercially feasible to manufacture on a mass production scale.

It is a further object to produce the pelletized thermosetting compound in the preferred spherical form to maximize its flowability and bulk.

To carry out these objectives, it is an object of the invention to process the thermosetting polymer or compound using a significantly different process.

According to the present process, it is an object of the invention to melt and blend the dry ingredients of the thermosetting compounds in a compounding extruder preferably of the co-rotating twin screw extruder type, and to control the temperature of the melt to just a few degrees above its melting temperature to avoid reacting and curing the thermosetting polymer material and permanently setting the mixture in the extruder.

In using the extruder, it is a further object to mount a die at the exit of the extruder to form the molten extrudate into strands and to control the temperature and flow characteristic of the material in this area in such a way as to maintain the melt above its extruding temperature while keeping it well below its reaction temperature.

It is yet another aspect of the invention to provide a water bath in contact with the die and to control the temperature of the die immersing bath to such a degree, that upon exiting the die, the strands are cooled sufficiently to enable them to be severed cleanly, and without smearing, by a cutter blade rotated in contact with the face of the die. The extrudate must not be at so low a temperature as to cause the material to solidify, and block off the extrusion ports.

According to yet another aspect of the invention, the pellets entrained in a water stream, are fed from the water bath to a pusher centrifuge having a conventional pre-drain funnel for initial separation of the water and pellets. The separated pelletized material from the pre-drain funnel is deposited on a high speed centrifuge basket operating at speeds in the neighborhood of 500–3000 r.p.m. to create G-forces of typically about 100 to 1,000, depending on the size of the centrifuge causing the water to be physically forced off the pellets and escape through slitted openings in the basket. A reciprocating pusher plate periodically displaces the virtually fully dried pellets axially along the basket causing the material at the edge of the basket to be pushed off for discharge.

According to a further important object, the pusher centrifuge is fitted with a specially designed deceleration ring that allows the pellets to decelerate sufficiently to prevent the pellets from fracturing upon discharge from the ring.

These and other objects and advantages of the present invention will become more readily apparent to those skilled in the art when considered in connection with the ensuing description and accompanying drawings.

THE DRAWINGS

Presently preferred embodiments of the invention are illustrated in the accompanying drawing, wherein.

DETAILED DESCRIPTION

This invention concerns the processing of grindable thermosetting compounds for use in the manufacture of thermosetting powder coating polymer materials. The thermosets involved include formulations of epoxy, epoxy-polyester hybrid, polyester, urethane and TGIC, and acrylic polymers, although this list is not intended to be exhaustive and the novel process may apply equally to other thermosetting compounds. The basic components that make up many thermosetting formulations include one or more resins, one or more crosslinking agents, one or more selected pigments, and flow aids, the selection and particular type of which will depend upon the specific formulation.

The process developed according to the invention for the successful production of thermosetting compound pellets especially suited to grinding on a mass production commercial scale involves an underwater pelletizing process in which special care has been taken to control the temperature and flow of the compound through the extruder and die to avoid their reacting and curing and a special drying process employed to dry the pellets produced in a highly efficient manner without causing them to fracture.

Figure 1:
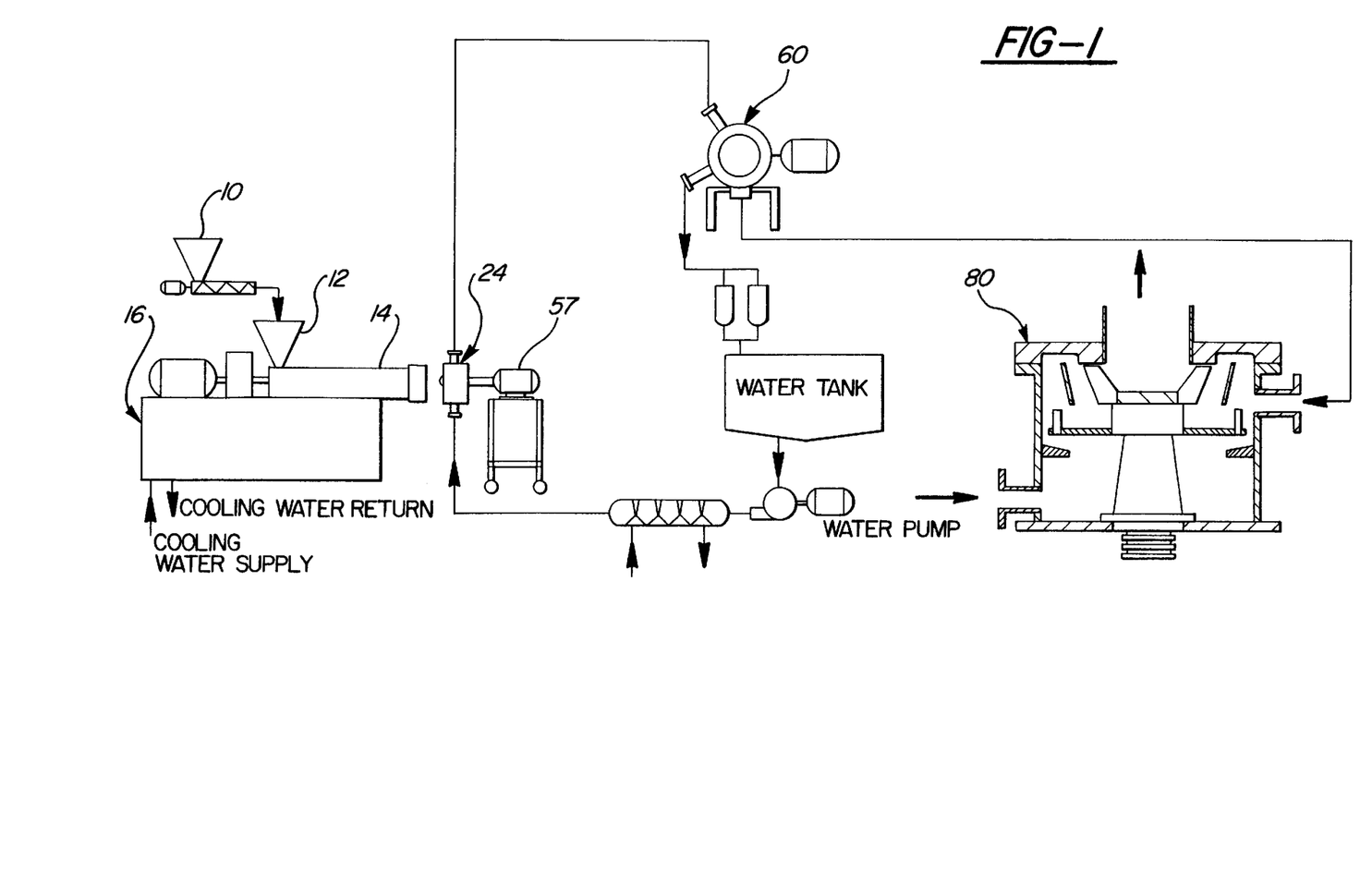
FIG. 1 is a schematic illustration of the processing components of the invention.
Figure 2:
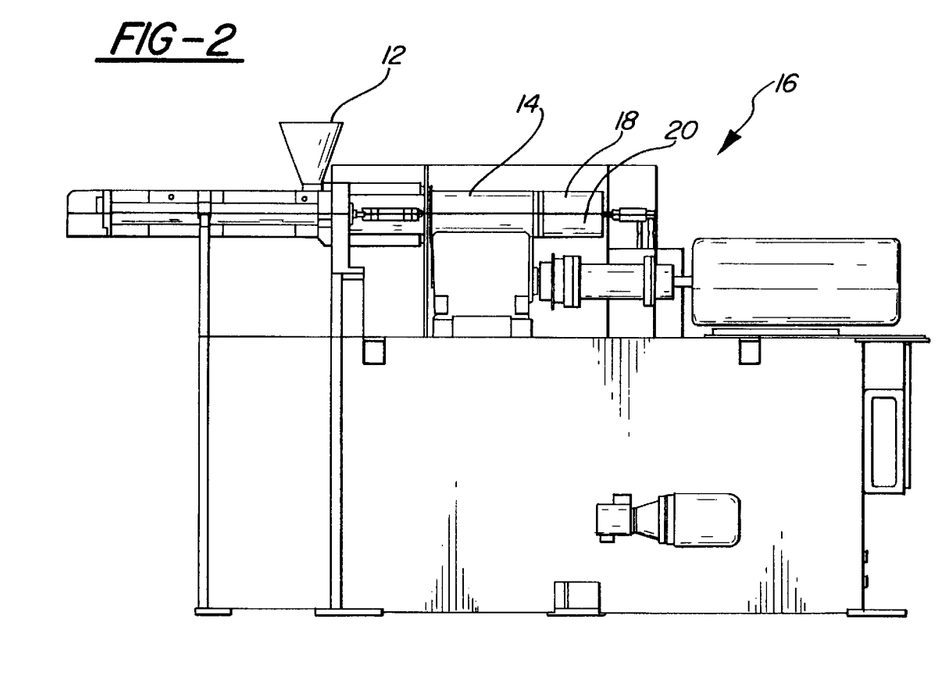
FIGS. 2 and 3 are schematic front and end views of the preferred extruder.

Turning now to the drawings and initially to FIG. 1, a schematic illustration of the process is shown in which the dry ingredients of the particular thermosetting compound, after having been thoroughly pre-mixed in the manner described previously, are charged via a volumetric feeder 10 to a hopper 12 for controlled delivery into the barrel 14 of a co-rotating twin screw compounding extruder 16 of the general type described in the aforementioned U.S. Pat. No. 3,195,868. Typical extruders are the MP Series manufactured by the assignee of the present invention.

Figure 3:
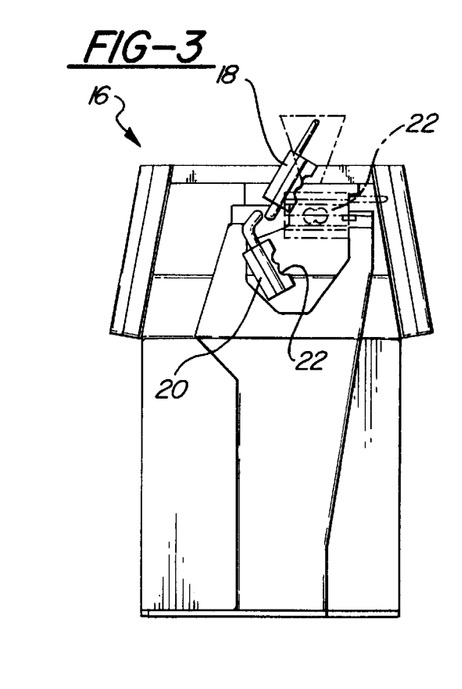

As shown in the '868 patent and in FIG. 3 hereof, the barrel 14 is of split design having longitudinally split separable clam shell housing portions 18, 20 that, when closed, define a mixing chamber 22 that has a generally figure-eight shape in transverse cross-section and extends the longitudinal length of the barrel 14 from its inlet end at the hopper 12 to its outlet end at the extrusion die assembly 24. Operating within the chamber 22 are a matched set of identical mixing screws 26 of the general nature disclosed in the '868 patent, but modified to accommodate the processing of the thermosetting material, as described below.

Figures 4, 5:
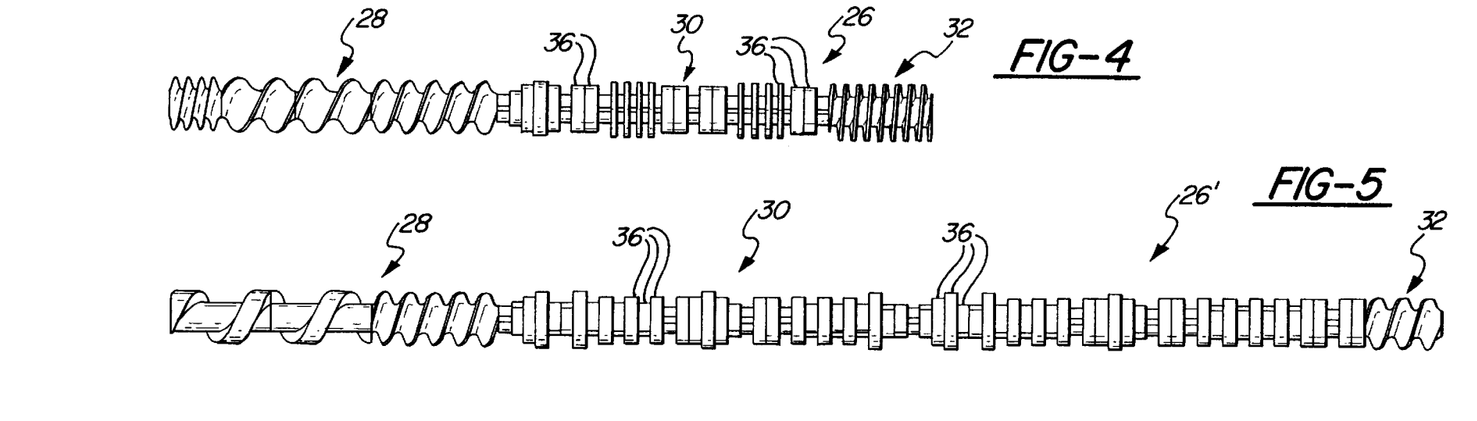
FIGS. 4 and 5 are alternate screw designs for use with the extruder.

FIGS. 4 and 5 illustrate two modified screw designs that may be employed in twin screws configuration, with others being contemplated but having the same basic features, with the same reference numerals being used to designate like parts. Those features include a helical feed screw portion 28, a compounding section 30, and a helical pressurizing section 32. The flight portions used in sections 28 and 32 and the paddles used in section 30 may all be referenced as co-wiping mixer elements. All screw sections are of bi-lobal (design) configuration in cross-section and completely wipe one another as well as completely wipe the wall surface of chamber 22.

The pre-mixed solid ingredients fed into the chamber 22 from hopper 12 enter the feed screw region 28 where they are simultaneously heated by a heating agent or by a heating medium such as water circulated through a surrounding water jacket 34 of the barrel 14 and in which they are compressed to increase the bulk density of the material as it is advanced toward the compounding or melting and mixing section 30. The heat of the water jacketing together with the mechanical shearing action of the feed screws 28 is carefully monitored and controlled to heat the material to within a few degrees above its melting point. A typical operating temperature at the pressure developed in the mixer-extruder (i.e. 200–500 p.s.i.) for most of the mentioned thermosets is in the range of about 175–350° F., but should be as low as can be tolerated by the extruder. The operating temperature is that temperature developed in the chamber after the material attains melt temperature and then rises to mixing and extruding temperature. With epoxy polymers the operating and discharge temperature range is 220–310° F. With acrylics and urethanes, the range is 240–350° F. and with polyesters, it is 230–320° F. In no case should the polymer material ever reach its reaction temperature for any material length of time while in the extruder, since this would cause the compound to take on a permanent set and would halt operation of the process. While the ingredients are disclosed as melted in the feed screw section 28, it would be possible to pre-melt the ingredients before receiving them in the compounder or mixer, although this step is not considered as feasible. The melted and fluid material from the feed screw or melt chamber portion 28 is advanced to the compounding section 30 where mating pairs of co-rotating radially interacting mixing paddles 36 of identical bi-lobal configuration act on the fluid viscous material, effecting a shearing and/or stretching action in the manner described in the '868 patent, resulting in an intimate and thorough mixing and kneading of the polymeric material while maintaining the material at the desired temperature.

Thoroughly mixed melt material exiting the compounding or blending section 30 at the operating temperature is drawn into the pressurizing compressing section 32 where the tight screw sections greatly compress the material in order to develop sufficient pressure and flow characteristics to immediately force it through the die assembly 24 without reacting and setting. The amount of pressure required and the particular design of the section 32 to develop such pressure and flow characteristics depend to a large degree on the particular formulation of the thermosetting material and the die involved. It should be observed, however, that the screws of the open-ended '868 extruder do not have a material pressurizing section since the material exiting the extruder does not pass through a die. In fact, prior to this invention, extruders used in the processing of flaked thermosetting compounds are not known to employ screws equipped with a final pressurizing section since none would be needed.

Turning now to FIGS. 6–9, not only is it important to pressurize the material before passage through the die assembly 24, it is also important that the flow of the material be controlled through proper design of the die to avoid curing and solidifying problems. All the material should have the same residence time in the twin screw mixer or compounder. The die assembly 24 of FIGS. 6–8 includes a die body 38 formed with a plurality of circumferentially spaced extrusion ports 40 extending longitudinally between inner and outer faces 42, 44 of the die body 38. A concentric central cone 46 tapers axially from the inner face 42 away from the discharge of the extruder 16. A matched adapter 48 is arranged between and serves to couple the die body 38 to the discharge end of the extruder 16. The adapter 48 has a central axial opening 50 and a conical inner surface 52 that widens in generally complementing relation to the cone 46 from the opening 50 to an imaginary circle on the inner face 42 of the die 38 bounding the outer-most radial edge of the extrusion ports 40.

Figure 6:
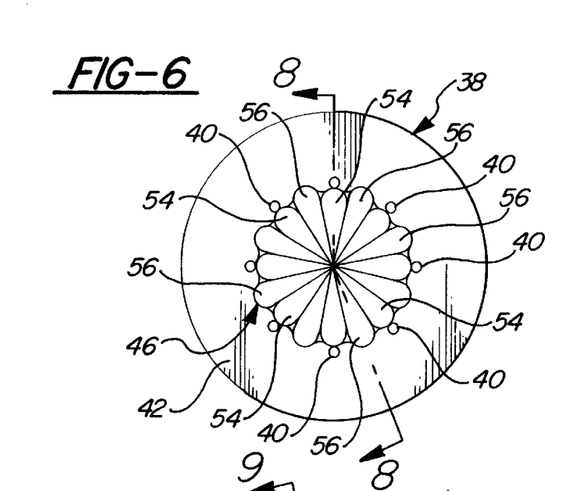
FIGS. 6 and 7 are elevational inner face end views of two alternate transition and die configurations that may be employed with the extruder.

The cone 46 in the FIG. 6 embodiment is fluted to provide a series of diverging distribution channels 54 separated by divergent lands 56. The lands 56 widen gradually and confront the conical wall 52 of the adapter 48 adjacent the inner face 42 of the die at locations between adjacent extrusion ports 40 to close off material flow to these areas. The distribution channels 54 comprise longitudinal grooves or depressions formed in the surface of the cone 46 in circumferential alignment with the extension ports 40 which effectively channel the material from the opening 50 of the adapter 48 to each of the ports 40 in a smooth and continuous fashion. While the channels 54 and lands 56 are formed in the cone 46, it is believed they could instead be formed in the surface 52.

Figure 7:
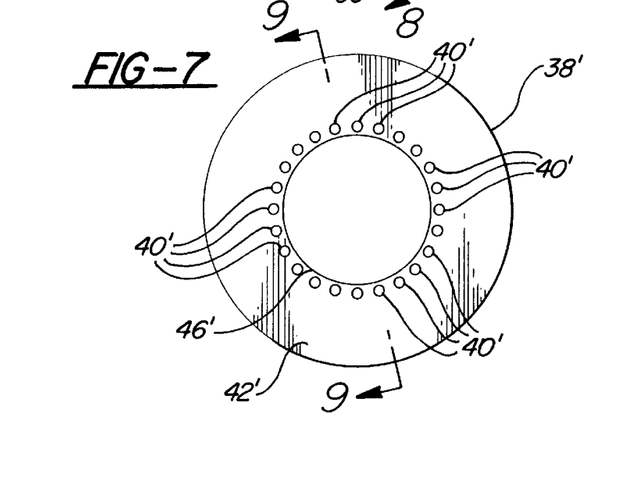
Figure 8:
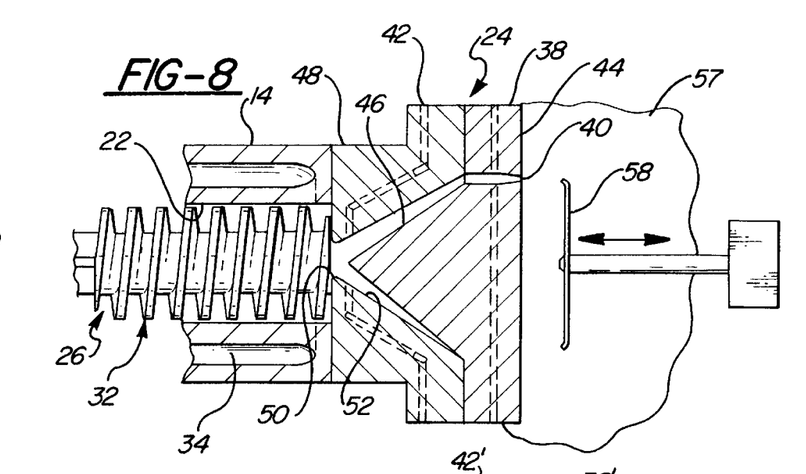
FIGS. 8 and 9 are sectional views, taken as though along lines 8—8 and 9—9 of FIGS. 6 and 7, respectively, showing the complete dies and their associated adapters.
Figure 9:
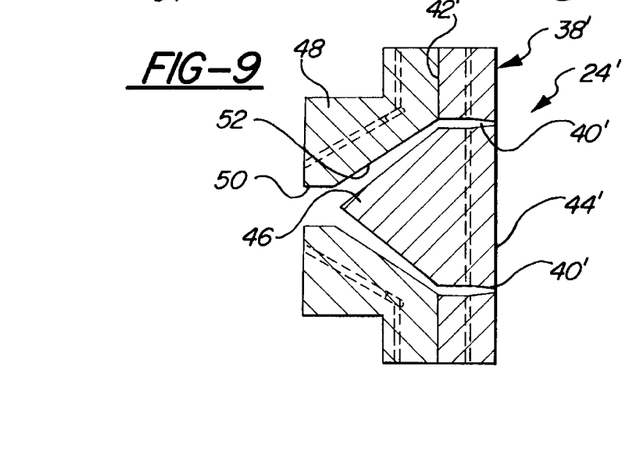

The die 38 and adapter 48 set of FIGS. 7 and 9 are similar except that the cone 46 is not fluted, but for some polymer processing, is suitable where a large number of extrusion ports 40 are present in the die so that there is little dead space between adjacent ports 40. Typically, the ports or orifices 40 and 40' may have a diameter of 0.1 to 0.125 inches.

It is important also to control the temperature of the material in the transition from the extruder 16 through the die 38 to avoid the material falling below its melting temperature, or approaching its reaction temperature, to prevent hardening of the material in the die.

Figure 12A:
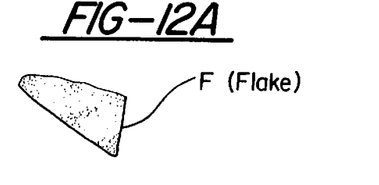
FIGS. 12a and 12b are plan views of thermosetting material produced in flake and pelletized form, respectively.
Figure 12B:
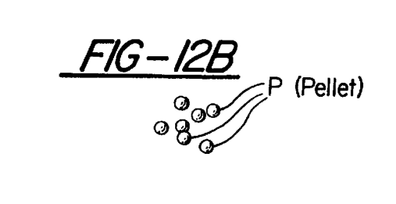

The material passing through the ports 40 or 49' is shaped into strands and as it exits the die 38 is immediately quenched in the underwater pelletizer bath 57 of water or another suitable coolant which is in contact with the die outer face and is simultaneously severed into generally spherical or spheroidal pellet P form (FIG. 12b) rather than flake F form (FIG. 12a) by means of a rotary cutter 58 of the general type disclosed in the aforementioned U.S. Pat. No. 3,564,650 operating on the outer face 44 of the die 38 which releasably connects to the end of the extruder barrel. Typically, the underwater cutter is movable toward and away from the die 38 and is a conventional unit purchasable from Gala Company of Eagle Rock, Virginia. The water temperature is carefully monitored and controlled in order to cool the strands sufficiently to permit them to be cleanly cut rather than smeared by the cutter 58 and to keep the pellets, once cut, from sticking to one another, but not so cool as to cause the material to harden in the extrusion ports 40. Maintaining the bath water temperature in the range 90–115° and typically at about 105° F.±2° F. has been shown to meet these objectives.

As the pellets P are cut, they are carried by the water stream in conduit C away from the die or piping 38 and are cooled to below their melting temperature. The pump P in FIG. 1 moves the water stream in the direction indicated. The action of the pellets being cut in the water bath causes them to develop a desirable spheroidal shape (i.e., slightly oblong but rounded at the ends) which enhances the bulk flowability of the pellets.

While cooling, the pellets are sent on to be dried in a pusher centrifuge drier 60 of the type disclosed in commonly owned U.S. Pat. No. 3,463,316, the disclosure of which is incorporated herein by reference. The pusher centrifuge which incorporates a pre-drain funnel as shown in the '316 patent may be modified at its discharge end as will be described hereinafter to accommodate the processing of the inherently brittle thermosetting materials.

Figure 10:
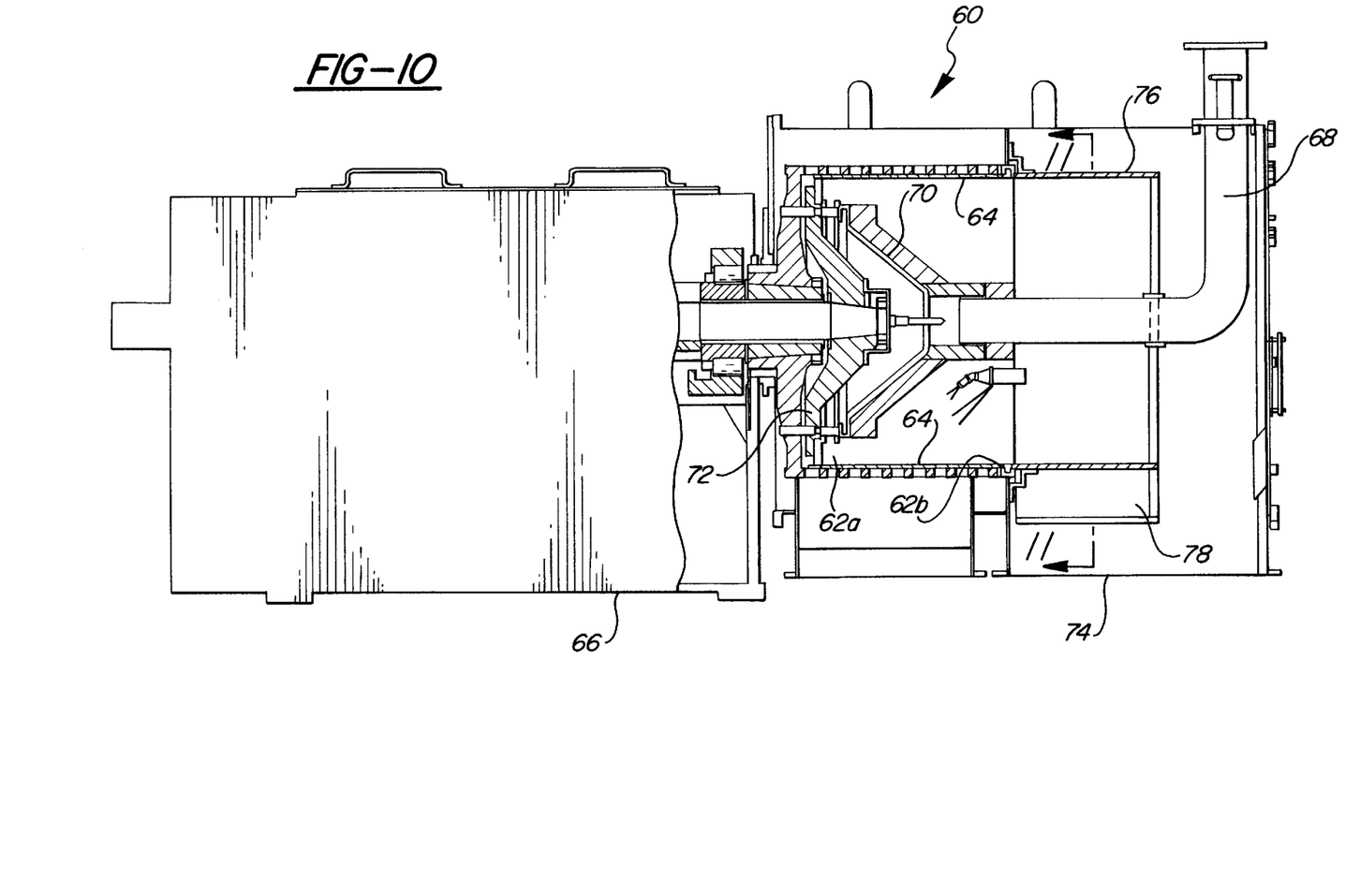
FIG. 10 is a schematic longitudinal sectional view of a pusher centrifuge modified according to the invention.
Figure 11:
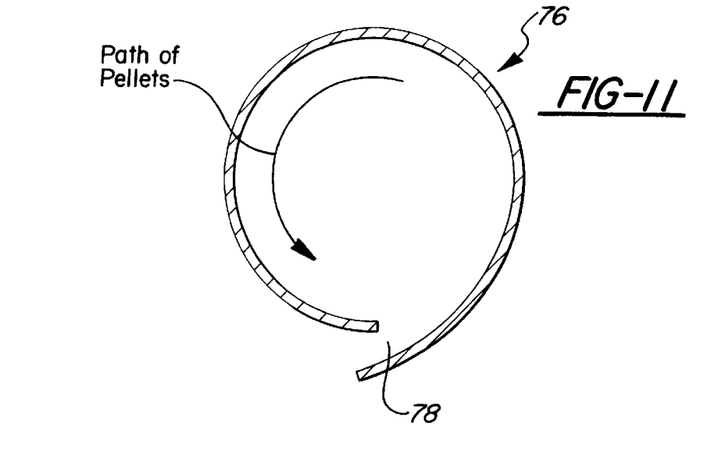
FIG. 11 is a cross-sectional view taken along lines 11—11 of FIG. 10 illustrating features of the deceleration ring.

Referring now to FIGS. 10 and 11, the drier 60 comprises an open-ended cylindrical filtration basket 62 having a screen made up of a plurality of closely spaced, but separated, longitudinal wedge bars 64 rotated at high speed by a prime mover 66 about a longitudinal axis of rotation of the basket 62. A water/pellet slurry (about 5% by volume pellets) is introduced through a charging pipe 68 to the pre-drain funnel 70 where a large part of the water is separated from the pellets. The remaining water and pellets are deposited on the forward part 62a of the screen 62 adjacent an axially reciprocable pusher plate 72. The screen 62 operates between 500–3000 rpm's imparting between 100–1,000 G-Force units to the deposited material depending on the diameter of the basket screen, to cause the water to separate from the pellets and escape through the slotted openings between bars 64 in the screen 62 without disintegrating the pellets which collect on screen or basket 62 in an annular bed. The reciprocating pusher plate 72 is periodically operated to physically push or displace the material axially toward the open end 62b of the screen 62, causing an annular band of pellets equal to the stroke of the pusher 72 to drop off the end of the screen 62 with each stroke. Typically, the pusher will have a stroke of about an inch to four and one-half inches, depending on the size of the basket screen. The motor for rotating the centrifuge basket 62 and pre-drain funnel 70, and reciprocating plate 72 in the conventional manner is shown at M.

Normally, in conventional dryers, dried material pushed off the end of the screen drops into a discharge ring whose wall is spaced radially outwardly of the screen surface and is open at the bottom for the discharge of the material from the ring. While most of the material encounters the wall of the ring before exiting the bottom, some material is caused to pass directly out through the open bottom where it is hurled with great force against the housing 74 of the drier. Subjecting thermosetting pellets to such forces would cause them to fracture.

To accommodate the pellets in one form of the invention, a special deceleration ring 76 is provided in place of the normal discharge ring. The ring 76 is fixed to the stationary housing 74 in generally radially aligned relation to the screen surface and extends rearwardly in axial prolongation of the screen 62. As shown best in FIG. 11, the ring 76 is somewhat spiral-shaped in transverse cross section and spirals out in the opposite direction of the rotation of the screen 62, and hence the particles dropping off the screen. As the pellets are pushed from the end of the screen 62, they are caused to travel in most cases several revolutions around the ring 76 in an outwardly spiraling path, all the while slowing their speed and losing their momentum to the point where they are left with too little energy to make another revolution, whereupon they drop through a guarded bottom opening 78 of the ring 76.

It will be appreciated from the design and placement of the ring 76 relative to the screen 62 that the pellets are subjected to very little impact force as they leave the screen 72 and it is not possible for the pellets to leave the ring 76 until they have lost substantially all of their momentum. It is to be further observed that the spiral configuration of the ring 76 prevents any pellets leaving the screen from passing directly through the opening in the ring as with the conventional discharge ring. The net result of providing the deceleration ring 76 is that all of the inherently brittle thermosetting pellets are dried very efficiently and effectively in a pusher centrifuge without fracturing them and creating fines.

Once dried, the pellets are fed in bulk to a grinder 80 of conventional character where they are reduced to a powder of small enough size to pass through a classifying sieve of the grinder and then sent on to a cyclone separator which separates out the powder from the process air stream. The grinder depicted receives the pellets at 80a, has a rotor 80b with disintegrators 80c, and a rotor screen 80d. The air stream introduced at 80e entrains the powder material and moves it up through screen 80d and out exit 80f.

In general terms, the thermoset polymer pellets are formed by melting the material in the twin screw mixer-extruder while maintaining them at a temperature which does not reach reactance temperature for any material length of time, with all of the material having substantially the same residence time in the machine so that it all remains at the same temperature. The material is fed to the die in divergent channeled pathways to accomplish this result and exits the die ports in an unreacted strand state into the quenching water bath. After predraining, the pellets are subjected to centrifugal forces of a nature to demoisturize them without disintegrating them and collect in an annular rotating mass or body which is pushed axially incrementally. The pellets at one discharge end of the mass have all moisture removed and are gradually decelerated in rotational speed to substantially a non-rotating state before being released.

Figure 13:
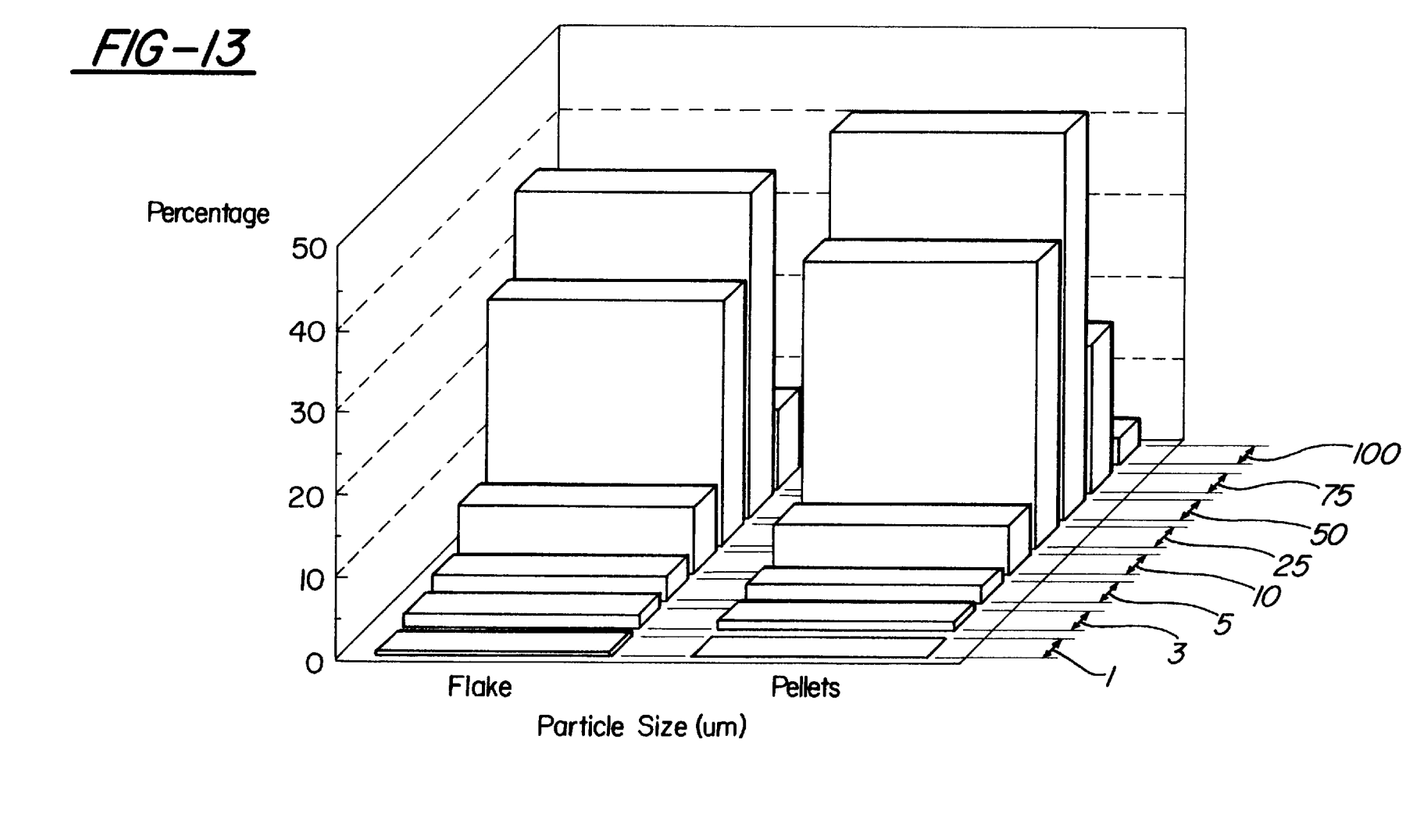
FIG. 13 is a diagram illustrating comparative partial size distribution data between thermosetting powder samples ground from flake and pellet forms of feed charge material.

It has been proved that the particle size distribution of the product is tighter as compared to flaked material. Also, the distribution curve tends to be shifted to the larger particle sizes of a specified product and produces less fines. As an example, the particle size distribution curves for both the pelletized and flaked form of an epoxy powder coating are shown in FIG. 13. As can be seen by the distribution curves, the pelletized material provides a product with a tighter particle size distribution while limiting the amount of small particle (fines). In a production environment, this would result in a higher yield of product while minimizing the amount of material which is wasted or reworked in the form of fines.

Due to the improved feed conditions and the uniform particle size and shape, the grinder itself operated more efficiently. The torque on the rotor was 10–15% lower with a pellet feed as compared to flake at equivalent rates. The torque was also more stable with the pellet feed. Since feeding the grinder is no longer a potential bottleneck, it is possible to run the grinder at its full volumetric capacity. Increases of as much as 50% throughput have been observed by utilizing pellets rather than flake in the grinder. Pellet size has a significant affect on the grinder efficiency and the particle size distribution. Smaller pellets yielded higher grinder efficiencies, tighter particle size distribution curves, and generated less fines than larger pellets (Table 2). Pellet length is controlled by the cutter speed of the pelletizer and can be varied between 1/16" to 1/4". The shape of the pellet is independent of the size and is always generally spheroidal in nature.

The pelletizing technology was developed to alleviate one of the primary concerns of most powder coating manufacturers—fines. Although this technology does not eliminate fines altogether, it does significantly reduce the amount of fines which are generated as well as provide some operational benefits. The amount of space required for this type of system is less as compared to a system utilizing a cooling belt. The overall grinding efficiency is higher as compared to grinding flake in terms of power consumption, particle size distribution, and overall throughput capacity. All material handling problems are virtually eliminated.

TABLE 1

Fines Retention vs. Pellet Size

| Particle Size (μm) | 3/16" Pellet | 1/8" Pellet | 1/16" Pellet |
|---|---|---|---|
| 1 | 0.6% | 0.5% | 0% |
| 3 | 1.7% | 1.4% | 0.5% |
| 5 | 3.1% | 2.6% | 2.1% |
| 10 | 8.2% | 7.6% | 6.5% |

It is to be understood that other embodiments of the invention, which accomplish the same function, are incorporated herein within the scope of any ultimately allowed patent claims.

I claim:

1. A continuous method of fabricating thermoset polymer pellets comprising the steps of:
   a. flowing thermosetting polymeric resin material axially in a temperature controlled mixer-extruder barrel from a charge end of the mixer-extruder barrel to a discharge end while intermixing the material and maintaining the material between a melt temperature and a higher thermosetting reaction temperature;
   b. extruding the material from the barrel at an extrusion temperature between said melt and reaction temperatures through a multiple-orificed die and severing the extruded material into generally spheroidal pellets;
   c. pumping a coolant liquid stream to said die, entraining said pellets in the stream, and pumping said stream with entrained pellets through a conduit leading from the die in which the pellets cool directly to the interior of an open ended, axially extending centrifuge basket having a porous circumferential wall and an interior annular pusher plate interiorly adjacent said wall;
   d. receiving said pellets on the said wall and rotating said wall and pellets to develop sufficient centrifugal force to demoisterize the pellets by removing liquid coolant through said basket wall while reciprocating the pusher plate and basket relatively to displace the pellets axially along and off the basket wall; and
   e. receiving the pellets from the basket wall.

2. The method of claim 1 wherein said resin material is melted in said mixer-extruder barrel and subject to shearing and stretching mixing action.

3. The method of claim 2 wherein said resin material is then compressed to pressurize it.

4. The method of claim 3 wherein said compressed resin material is extruded from said mixer-extruder through multiple die orifices in the form of strands which are simultaneously coolant stream quenched and severed to form said pellets.

5. The method of claim 4 wherein the compressed resin material flows in a diverging stream to said die orifices.

6. The method of claim 4 wherein the compressed resin material is directed into divergent channels leading to said die orifices.

7. The method of claim 1 wherein pellets moved off the basket wall are forced to travel in an axially spiraling, rotation-decelerating path wherein their rotative momentum is dissipated prior to release.

8. The method of claim 2 wherein said resin material in said barrel is maintained within a temperature range of 140–270° F.

9. The method of claim 8 wherein said resin material is an epoxy and its extrusion temperature is in the range of 220–270° F.

10. The method of claim 4 wherein said die orifices are in the range of 0.09 to 0.150 inches in diameter.

11. The method of claim 1 wherein said pellets are ground to a powder suitable for electrostatic powder coating processes after step e.

12. A method of constructing a continuous apparatus for fabricating efficiently grindable thermoset polymer pellets comprising the steps of:
   a. providing a mixer-extruder having axially extending intersecting barrel walls forming a mixing chamber in which mixer screws are axially received, the screws incorporating interwiping mixer elements which also wipe the chamber walls from a charge end of the chamber to which resin material is introduced to an extruder discharge end; the mixing chamber being maintained at a temperature and pressure to melt the material without reaching reacting temperature and the mixing elements being configured to advance the material and mix it, to compress it to pressurize its flow, and then to extrude it; there being a die at said discharge end with multiple orifices through which the material is extruded in the form of strands, a cutter for severing said extruding strands into pellets, and a coolant liquid stream for quenching said pellets as they are extruded and severed;

b. connecting conduit for said stream and severed pellets leading from said die to the interior of an open ended axially extending centrifuge basket having a porous, peripheral wall and an interior annular pusher plate interiorly adjacent said wall;

c. providing a pump connecting with said conduit for moving pellets entraining in said coolant liquid to the interior of said basket;

d. providing a drive for rotating the basket and pellets received in a bed thereon to demoisterize the pellets by removing liquid coolant through the basket wall and for reciprocating the pusher plate and basket relatively to displace the pellets axially along and off the basket wall; and e. providing a pellet decelerating mechanism at the end of said basket to receive the pellets discharged off the basket and direct them in a spiraling path decelerating their rotation prior to releasing them.

13. The method of claim 12 wherein a spiral wall is attached to said basket as a pellet decelerating mechanism which causes said pellets to be deflected to follow said path, said spiral wall terminating in an opening at its lower end to release said pellets by gravity.

14. A continuous apparatus for manufacturing thermoset polymeric pellets comprising:

a. a mixer-extruder having axially extending intersecting barrel walls forming a mixing chamber in which twin mixer screws are axially received, the screws comprising mutually interwiping mixing paddle portions which also wipe the chamber from a charge end of the chamber to which the polymeric resin material is introduced to an extruder discharge end;

b. the paddle portions being configured to advance the material, mix it, compress it to pressurize its flow, and then to extrude it;

c. said barrel walls having a charge opening at the charge end of the chamber to introduce said polymeric material thereto;

d. a heating agent for maintaining the mixing chamber at a temperature and pressure to melt the material without reaching reacting temperature in the chamber;

e. a die at the discharge end of said chamber with multiple orifices through which the material is extruded in the form of extruding strands;

f. a cutter for severing said extruding strands into pellets;

g. a coolant liquid stream for quenching said pellets as they are extruded and severed;

h. an open-ended, axially extending centrifuge basket having a porous, peripheral wall and an interior annular pusher plate peripherally adjacent said porous wall, a drive for rotating the basket and for relatively reciprocating the pusher plate and basket to displace the pellets axially along and off the basket wall;

i. a conduit for said stream and pellets entraining therein leading from the vicinity of said die to the interior of said basket wall; and j. a pellet decelerator at the end of said basket to receive the pellets discharged off the basket; configured to direct them in a path decelerating their rotation prior to releasing them.

15. A continuous method of fabricating thermoset polymer pellets comprising the steps of:

a. flowing thermosetting polymeric resin material axially in a temperature controlled mixer-extruder barrel from a charge end of the mixer-extruder barrel to a discharge end while maintaining the material above a melt temperature and below a higher thermosetting reaction temperature and intermixing it;

b. pressurizing the material to an extrusion temperature and then extruding the material from the barrel at an extrusion temperature between said melt and reaction temperatures through a multiply orificed die having an exterior face and severing the extruded material into substantially spherical pellets;

c. cooling said exterior face of the die and the severed pellets in a circulating coolant liquid stream, entraining the pellets in the stream; and pumping said stream with entrained pellets directly from the die to the interior of an open ended, axially extending centrifuge basket having a porous circumferential wall and an interior annular pusher plate interiorly adjacent said wall; and d. receiving said pellets on the wall and rotating said pellets to develop sufficient centrifugal force to demoisterize the pellets by removing liquid coolant through said basket wall, while reciprocating the pusher plate and basket relatively to displace the bed of pellets formed axially along and off the basket wall.

16. A continuous method of fabricating thermoset polymer pellets comprising the steps of:

a. flowing thermosetting polymeric resin material axially in a temperature controlled mixer-extruder barrel from a charge end of the mixer-extruder barrel to a discharge end while subjecting it to a shearing and stretching mixing action and while maintaining the material between a melt temperature and a higher thermosetting reaction temperature within the range of 220–270 F.;

b. extruding the material from the barrel at an extrusion temperature between said melt and reaction temperatures and forming the extruded material into generally spheroidal pellets;

c. cooling said pellets in a coolant liquid stream, entraining them in the stream, and charging them to the interior of an open ended, axially extending centrifuge basket having a porous circumferential wall and an interior annular pusher plate interiorly adjacent said wall;

d. receiving said pellets on the wall and rotating said pellets to develop sufficient centrifugal force to demoisterize the pellets by removing liquid coolant through said basket wall while reciprocating the pusher plate and basket relatively to displace the pellets axially along and off the basket wall; and e. receiving the pellets from the basket wall.

17. The method of claim 16 wherein said resin material is extruded from said mixer-extruder through multiple die orifices in the range of 0.09 to 0.150 inches in diameter in the form of strands which are simultaneously coolant stream quenched and severed to form said pellets.

18. The method of claim 16 wherein the resin material flows in divergent streams to said die orifices.

19. The method of claim 16 wherein said resin material is an epoxy and its extrusion temperature is in the range of 220–270 F.

20. The method of claim 16 wherein said pellets are ground to a powder suitable for electrostatic powder coating processes after step e.

* * * * *